INVENTORS.
RALPH W. RITCHIE
FERN JOAN RITCHIE
MIRIAM G. PIEQUET

Christie, Parker & Hale
ATTORNEYS.

United States Patent Office 3,478,440
Patented Nov. 18, 1969

3,478,440
TEACHING DEVICE
Ralph W. Ritchie and Fern Joan Ritchie, 318 E. Bonnie Brae Court, and Miriam G. Piequet, 1551a Dahlia Court, all of Ontario, Calif. 91762
Filed Sept. 26, 1966, Ser. No. 582,056
Int. Cl. G09b 3/00
U.S. Cl. 35—9      7 Claims

ABSTRACT OF THE DISCLOSURE

A teaching device in which one or more colored filter sheets are used selectably to conceal answer information on an underlying question sheet. A student writes his answer on the filter sheet or on an overlying transparent sheet, and the filter sheet is then lifted or slipped off the question sheet to reveal the correct answer for comparison to the student's response. Use of several filter sheets adapts the device to multi-part questions. In one form, the sheets are bound in book form to provide a convenient and reusable teaching system.

BACKGROUND OF THE INVENTION

There is a need in the education field for teaching equipment which is easily and economically produced, and which permits the student to check or verify his answers against temporarily concealed correct answers displayed adjacent one or more questions as found in programmed-instruction formats. We have developed a simple, but highly effective device which meets this need. The device is reusable, adapted for self-checking of answers by the student, and is also useful where answers are to be reviewed and graded by an instructor.

Our invention contemplates the use of a colored, transparent filter sheet through which is viewed a separate sheet bearing questions and answers. The answers are printed in a color similar to the color of the filter sheet, and are not visible through the filter sheet. The questions are printed in black (or in a relatively dark color which is markedly dissimilar from the color of the filter sheet) to be visible through the filter sheet. The student views the question through the filter sheet, and marks his answer directly on the filter sheet or on an overlying clear transparent sheet. The answer is then checked by simply lifting the filter sheet out of position to reveal the correct answer.

The invention is especially well adapted to multi-part or two-step questions in which a first stage of a question is answered and checked before proceeding to a second stage of the question. In this application, several filter sheets of different filtering characteristics are used, and answers to the several stages are printed in different colors so one answer is revealed when the top filter sheet is lifted, and the second answer remains concealed until the bottom filter sheet is lifted. The question may also be printed in several colors to make possible the presentation of additional stimuli or cues as the student begins work on the second stage of the question after lifting or removing the top filter sheet.

The various sheets used in our teaching device may be unbound and manually assembled for use, or may be bound together in a variety of styles. The concept of the invention is useful in many varied forms, and this flexibility permits adaptation to a number of different teaching applications. In all such applications, the invention is characterized by economy, effectiveness, and ease of use.

Briefly stated, our teaching device comprises a question sheet having a first marking defining a question and a second mark defining an answer to the question. The second marking is of a color different from the color of the first marking. A first transparent filter sheet is disposed over the surface of the question sheet whereby light incident on and reflected by the question sheet passes through the filter sheet. The filter sheet is of a color which permits reading of the first marking through the filter sheet and which prevents reading of the second mark through the filter sheet. The filter sheet has a surface adapted to receive marks from a writing instrument whereby a response to the question can be written on the filter sheet and subsequently checked by separating the filter sheet and the question sheet to expose the second marking.

In a preferred form, the filter sheet is reddish in color, and the second marking is yellow or orange in color. In an alternative form, the question sheet further includes a third marking of a second color differing from the colors from the first and second markings and being readable when viewed through the first filter sheet. A second transparent filter sheet is disposed over the first filter sheet and the question sheet, the second filter sheet being of a color which prevents reading therethrough of the third marking, and permits reading therethrough of the first marking. Preferably, binding means are provided for securing together one edge of the question and filter sheets.

In another form, the question and filter sheets are used in conjunction with a clear, colorless, transparent answer sheet disposed over the filter sheet and having a surface adapted to receive marks from a writing instrument. The student enters a response to the question on the transparent answer sheet, and then removes the filter sheet from the packet of several sheets to expose the previously hidden markings which define the correct answer to the question.

The invention will be described in detail with reference to the attached drawings, in which.

Figure 1:
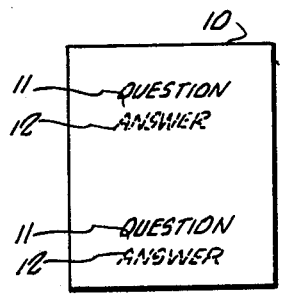
FIG. 1 is a plan view of a question sheet having two sets of questions and answers printed thereon in different colors.
Figure 2:
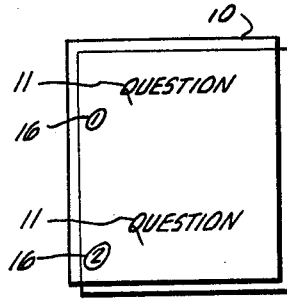
FIG. 2 is a plan view of the question sheet with a filter sheet positioned thereover.
Figure 3:
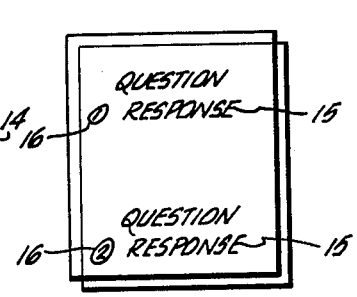
FIG. 3 is a plan view of the question and filter sheets after a response has been entered by a student.

A single-filter form of our invention is shown in FIGS. 1–3, and includes a question sheet 10 of paper, cardboard, or any other convenient printable material having a light surface color such as white. The size of the question sheet depends upon the needs of a particular teaching program, and may range from small cards through notebook-size pages or larger. A pair of first markings 11 are printed on the surface of the question sheet to define a pair of questions to be answered by a student. The first markings are made in a dark ink or other writing medium which is preferably black in color. Printed below each of the first markings is a second marking 12 which defines an answer to each respective question. The second markings are printed in a relatively light color such as orange or yellow, and the choice of these colors is discussed more fully below.

Referring to FIG. 2, a filter sheet 14 is superimposed over question sheet 10. The filter sheet is of a size at least large enough to cover second markings 12, and, for convenience, can be the same size as the question sheet. The filter sheet is formed from a sheet of plastic such as cellulose acetate of, say, 0.003 to 0.005 inch thickness, and the sheet is colored and substantially transparent.

The choice of color of the filter sheet depends upon the color used in printing second markings 12, and a number of different color pairs are useable. Color pairs are selected such that the filter sheet conceals the second markings when it is positioned over the question sheet. That is, the color-subtraction filtering action of the colored filter sheet so modifies the incident and reflected light passing through the filter sheet than the second markings are invisible to one viewing the question sheet through the filter sheet.

For example, if superimposed sheets 10 and 14 are illuminated by white light, a red filter sheet will absorb the green and blue portions of the incident light and transmit only the reddish portions of this light. Much of this light will be reflected back through the filter sheet by second markings 12 which are printed in yellow or orange colors. However, the question sheet, which is preferably white or light in color, also reflects the incident reddish light which has passed through the filter sheet. The filter sheet therefore imparts a uniform reddish color to both the second markings and the unmarked surface of the question sheet. The second markings thus merge into the background of the unmarked surface of the question sheet, and become invisible to the viewer as there is no longer any color discrimination or contrast between the second markings and the unmarked surface of the question sheet surrounding these markings.

First markings 11, which define questions or other stimuli to be presented to the student, remain visible through the filter sheet as they are printed in black or dark-colored ink. Black ink absorbs the incident filtered light passing through the filter sheet, and retains its black appearance when viewed through the filter sheet as substantially no light is reflected back to the viewer from the first markings. The effect of the filter sheet is thus to completely conceal the second markings or answers, while still permitting the first markings or questions to be readily seen by the student. Directing both the incident and reflected light through the filter sheet improves the efficiency of the filtering action, and assures adequate observation of the answer printed on the question sheet.

The choice of color pairs and printing techniques must be made with care in several respects. The color pairs must of course be chosen such that the second markings vanish or merge into the surface background of the question sheet. The second markings should be a fairly light color to avoid the need for excessively dark colors in the filter sheet which would tend to obscure the first markings defining the questions. The ink used to print the second markings should be pure, and not grayed as sometimes occurs in half-tone reproductions or by intentional mixing of gray ink for subtlety. The presence of gray in the second marking may make the answers visible as faint outlines through the filter sheet, and is therefore to be avoided. Embossing or warping of the question sheet in the area of the second markings is also to be avoided as these distortions can create shadows along the second markings which may make the answers faintly visible through the filter sheet to the student.

The surface of filter sheet 14 is adapted to receive marks from a crayon, wax pencil, or other conventional writing instrument. As suggested in FIG. 3, the student writes a response 15 to the questions directly on the top surface of the filter sheet. After the student has considered the question and entered his response on the filter sheet, the filter sheet and question sheet are separated to make visible second markings 12 which define the correct answers to the question. The student is thus able to verify immediately the correctness of his response.

The filter sheet is separable from the question sheet and may therefore be submitted to the teacher for separate grading if desired. If a number of responses are required on a single filter sheet, it is helpful to add a set of index markings 16 on the filter sheet which may be in the form of numbered blanks, boxes, or the like, to assist the teacher in correlating each response with the corresponding question. Responses which are entered in crayon, wax pencil, or a similar marking instrument, are readily wiped from the filter sheet after grading or review, and the filter sheet is therefore reusable.

Figure 4:
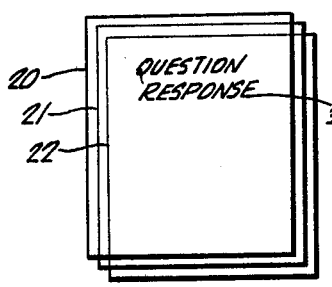
FIG. 4 is a plan view of an alternative form of the invention in which two filter sheets are superimposed over a question sheet.
Figure 5:
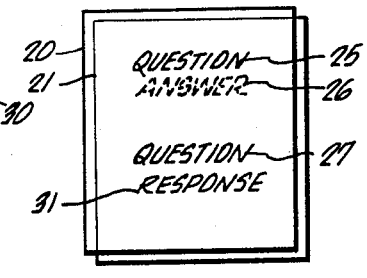
FIG. 5 is a view of the assembly shown in FIG. 4 after the uppermost filter sheet has been removed.
Figure 6:
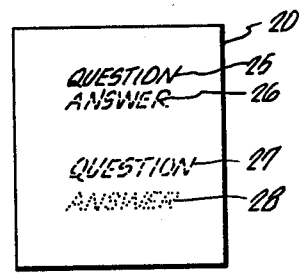
FIG. 6 is a plan view of the question sheet alone as used in the assembly of FIG. 4.

Another form of our invention is shown in FIGS. 4–6, and is especially suitable for multi-part questions, or for introducing multiple stimuli to the student. In this form, a question sheet 20 is covered by a first filter sheet 21, and the first filter sheet is in turn covered by a second filter sheet 22. As shown in FIG. 6, question sheet 20 includes a first marking 25 defining a first question, and printed thereon in ink of a dark color such as black. A second marking 26 defining an answer to the first question, and a third marking 27 defining a second question related to the first question, are also printed on the question sheet in a color such as orange. A fourth marking 28 defining an answer to the second question appears on the surface of the question sheet in a light color such as yellow.

First and second filter sheets 21 and 22 are of different colors, and are selected to reveal sequentially the information defined by the several questions and answers printed on the question sheet. For example, the first filter may be a yellow filter through which yellow fourth marking 28 is concealed by the same process described above. The yellow filter does not, however, conceal black first marking 25 or orange second and third markings 26 and 27. Second filter 22 is, for example, red in color to obscure second and third markings 26 and 27, but to permit viewing of first marking 25 through the two filter sheets.

The assembled packet of question and filter sheets as presented to the student is shown in FIG. 4, and only the first question defined by first marking 25 is visible to the student through the two filter sheets. The student enters a response 30 to the first question on the surface of the second filter sheet, and then checks his response by removing the second filter sheet from the packet. Second and third markings 26 and 27 then become visible through the yellow first filter sheet, and the student is presented with the correct answer to the first question and also a new second question which is logically correlated to the first question. As suggested in FIG. 5, the student enters a second response 31 to the second question on the surface of the first filter sheet, and then removes the first filter sheet from the question sheet to reveal fourth marking 28 defining the correct answer to the second question.

Filter sheets 21 and 22 may be graded by the student, or may be submitted to the teacher for review and grading as described above. The filter sheets are of course reusable as the response from the student is entered in an erasable medium such as crayon or wax pencil. The filter sheets may also bear index marks (not shown) to facilitate proper placement of responses by the student.

Figure 7:
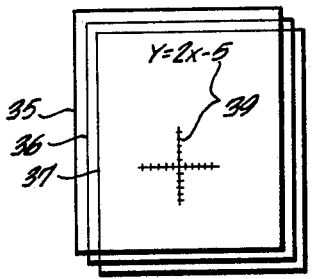
FIG. 7 is a plan view of another alternative form of the invention in which a filter sheet and a clear, transparent answer sheet are superimposed over a question sheet.
Figure 8:
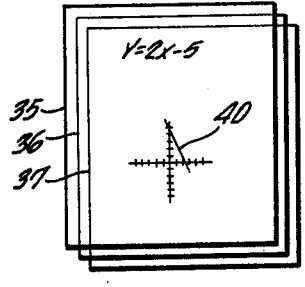
FIG. 8 is a plan view of the assembly shown in FIG. 7 after the student has entered an incorrect response on the answer sheet.
Figure 9:
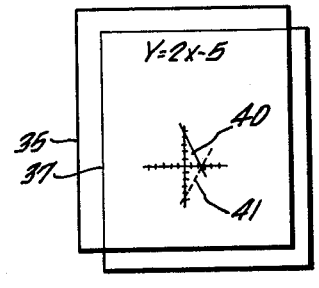
FIG. 9 is a plan view of the assembly shown in FIGS. 7 and 8 after the filter sheet has been removed to reveal the correct answer.

Another form of our teaching device is shown in FIGS. 7–9, and is especially suitable for teaching applications where it is desirable to superimpose the student's response directly over a temporarily concealed correct answer. In this form, a question sheet 35 is covered by a filter sheet 36 which is transparent and of a color such as red. A clear, transparent answer sheet 37 is superimposed over the top of the filter sheet.

A set of first markings 39 defining a question are printed in a dark-colored ink such as black ink on the surface of the question sheet. In the example shown in FIGS. 7–9, the question consists of an algebraic equation and a set of Cartesian coordinates, and the student is presented with the problem of graphing the equation. As shown in FIG. 8, the student enters a response 40 in crayon or wax pencil directly on the top surface of transparent answer sheet 37.

Filter sheet 36 is then stripped from the center of the sandwich of the several sheets, revealing a second marking 41 which defines the correct answer to the given problem. Second marking 41 is printed on the question sheet in a color such as orange which is concealed from the student when the filter sheet is in place, as described above. In the example shown in FIGS. 7–9, the student has entered an incorrect response, and his error is immediately obvious when the filter sheet is removed from the sandwich or packet of sheets.

This form of the invention is also useful for exercises in orthographic projections or other problems where it is desirable to see a direct overlay of the response and correct answer to permit quick and accurate checking of the student's response. The use of a clear, transparent answer sheet is also useful in the forms of our invention shown in FIGS. 1–3 and 4–6, and finds particular utility where it is desirable to use one or two filter sheets with a number of sets of question and answer sheets. As described above, the answer sheet is of course reusable by simply erasing the markings applied by the student.

Figure 10:
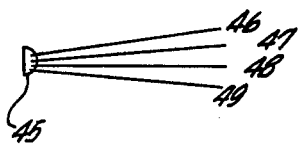
FIG. 10 is a side view of a set of question and filter sheets secured together by binding means.

FIG. 10 shows one of many possible forms of binding which may be used to secure together several sets of the sheets described above. A conventional ring binder 45 is used to bind together a first filter sheet 46, first question sheet 47, second filter sheet 48, and second question sheet 49. That is, the binder is used to secure together two sets of the sheets illustrated in FIGS. 1–3. The filter sheets may be retained in the binder, or may be removed for grading and review by the teacher if desired.

Figure 11:
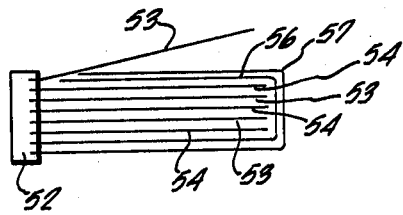
FIG. 11 is a side view of a pair of filter sheets, and several sets of question sheets and answer sheets, the sheets being secured together by binding means.

Another form of binding is shown in FIG. 11, and includes a binding means 52 which may be of the releasable type such as a ring or post binder, or may be a permanent binding such as used in books. Any convenient number of sets of clear, transparent answer sheets 53 and question sheets 54 are secured together by the binding means as pages in a book. A first filter sheet 56 and second filter sheet 57 are secured to the binding at the bottom of the stack of question and answer sheets. The first and second filter sheets are somewhat more than twice the width of the question and answer sheets whereby they may be folded back on themselves and inserted between the question and answer sheets of any set. In FIG. 11, the filter sheets are shown as removably positioned between the uppermost question and answer sheets in the stack. This assembly combines the flexibility and utility offered by the devices shown in FIGS. 4–6 and 7–9.

In use, the student positions the filter sheets between the question and answer sheets and proceeds to enter his responses to the multi-part question in the same manner as described above with reference to FIGS. 4–6. After his first response is entered, second filter sheet 57 is removed to reveal the first answer and the second part of the question. The student then enters the second response on answer sheet 53, and then removes the first filter sheet to reveal the second correct answer printed on the question sheet. The superposition techniques described above with reference to FIGS. 7–9 may of course be used with this form of our teaching device. When the student has completed the problem presented by the uppermost question sheet in the stack, he reinserts the filter sheets between the next question and answer sheet in the stack and proceeds to enter his responses in the same fashion as just described.

Bearing in mind the precautions already stated above regarding choice of color, avoidance of graying in the colored inks, embossing, etc., many different color pairs or triplets are useful in our teaching device. We have found that yellow or orange inks are very suitable for use with reddish filters, and that yellow and orange inks can be used with orange and red filters when a dual-filter device is selected. Pure yellows are concealed effectively by orange or red filters.

As an example of colors which have been found suitable for use in the dual-filter version of our teaching device, a yellow marking on the question sheet may be made by ink corresponding in color to a "Mongol" 817 pencil or Flax's "Maniere 3000" yellow marking pen. A suitable orange color is provided by a "Flax's Maniere 3000" orange marking pen, or by a "Mongol" 862 pencil. Color purity and a fairly high level of lightness or "value" (using this term in the sense of the Munsell color system) are the main characteristics to observe in the choice of marking media. Suitable filters are, for example, the "Roscoline" 817 "dark amber" filter and the "Roscoline" 819 "orange amber" filter, as sold by the Edmund Scientific Company, Barrington, N.J. The 817 filter will obscure yellow markings, and the 819 filter will obscure both yellow and orange markings. These two filters can be used together in a dual-filter system. Many other color combinations are of course possible, and these specific colors are cited by way of example only.

There has been described a novel, low-cost teaching device which is both flexible in application and appealing to teacher and student. The device is especially well adapted for self-teaching applications where the student is to verify the correctness of his response immediately after its entry. The sheets which are marked by the student are immediately reusable by simply erasing the responses entered thereon. The device may also be used to reinforce learning by using the filter and question sheets in the style of flash cards with verbal responses being used by the student. The question sheet alone may of course also be used in this type of reinforcement teaching.

Our teaching device may of course be used with many different types and styles of question and answer information, and it is also adapted to various types of bindings and shapes. The specific forms of the invention shown in the drawings and described above are by way of example only, and are not intended to limit the scope of the invention as defined in the following claims.

We claim:
1. A teaching device, comprising:
   a question sheet bearing on its surface a first marking defining a question, a second marking defining information relating to the question, the second marking being of a color different from the first marking, and a third marking defining information relating to the question and being of another color differing from the colors of the first and second markings;
   a first transparent filter sheet disposed over the surface of the question sheet whereby light incident on and reflected by the question sheet passes through the filter sheet, the filter sheet being of a color which permits reading of the first and third markings through the filter sheet and which prevents reading of the second marking through the filter sheet; and
   a second transparent filter sheet disposed over the first filter sheet and the question sheet, the second filter sheet being of a color which prevents reading therethrough of the third marking and which permits reading therethrough of the first marking, whereby the second and third markings are selectably revealed by separating the filter sheets from the question sheet.
2. The teaching device defined in claim 1 in which the filter sheets have surfaces adapted to receive marks from a writing instrument.
3. The teaching device defined in claim 1 in which the first filter sheet is yellow, the second filter sheet is red, the second marking is yellow, and the third marking is orange.

4. The teaching device defined in claim 3, and further comprising binding means for securing together edges of the question sheet and filter sheets.

5. The teaching device defined in claim 1, and further comprising a transparent answer sheet disposed over the filter sheets and having a surface adapted to receive marks from a writing instrument whereby a response to the question visible through the answer and filter sheets can be written on the answer sheet and subsequently checked by removing a filter sheet from the question sheet to expose the previously concealed marking.

6. The teaching device defined in claim 5 in which the first filter is yellow, the second filter is red, the second marking is yellow, and the third marking is orange.

7. The teaching device defined in claim 5 and further comprising binding means for securing together one edge of the question, filter and answer sheets, the filter sheets being respectively folded back on themselves to be removably insertable between the question and answer sheets without unbinding the sheets.

References Cited
UNITED STATES PATENTS

| | | | |
|---|---|---|---|
| 992,751 | 5/1911 | Bottle | 282—8.1 |
| 1,422,527 | 7/1922 | Berger. | |
| 2,725,644 | 12/1955 | Wade | 35—48.1 |
| 2,751,690 | 6/1956 | Cohen. | |
| 3,174,231 | 3/1965 | Schure | 35—9 |
| 3,248,050 | 4/1966 | Dickson | 35—9 |
| 3,251,141 | 5/1966 | MacRae | 35—9 |
| 3,287,827 | 11/1966 | Lippman | 35—9 |

EUGENE R. CAPOZIO, Primary Examiner

WALTER W. NIELSEN, Assistant Examiner